United States Patent
Maeda

(10) Patent No.: US 12,110,848 B2
(45) Date of Patent: Oct. 8, 2024

(54) INTAKE DUCT

(71) Applicant: TOYOTA BOSHOKU KABUSHIKI KAISHA, Aichi-ken (JP)

(72) Inventor: Kunitaka Maeda, Nagoya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 371 days.

(21) Appl. No.: 17/434,928

(22) PCT Filed: Nov. 27, 2020

(86) PCT No.: PCT/JP2020/044304
§ 371 (c)(1),
(2) Date: Aug. 30, 2021

(87) PCT Pub. No.: WO2021/124840
PCT Pub. Date: Jun. 24, 2021

(65) Prior Publication Data
US 2022/0145835 A1    May 12, 2022

(30) Foreign Application Priority Data
Dec. 18, 2019    (JP) .................. 2019-228034

(51) Int. Cl.
*F02M 35/10*    (2006.01)

(52) U.S. Cl.
CPC . *F02M 35/10124* (2013.01); *F02M 35/10111* (2013.01)

(58) Field of Classification Search
CPC ....... F02M 35/10124; F02M 35/10111; F02M 35/10; F02M 35/10091; F02M 35/10144; Y02T 10/12
See application file for complete search history.

(56) References Cited

U.S. PATENT DOCUMENTS 6,553,953 B1 * 4/2003 Fujihara ............. F02M 35/1283
                                                        123/184.21
8,915,235 B2 * 12/2014 Luft ................. F02M 35/10222
                                                        123/590

(Continued)

FOREIGN PATENT DOCUMENTS

| CN | 115163361 A | * | 10/2022 |
| CN | 218717197 U | * | 3/2023 |
| JP | 5993949 | | 9/2016 |

OTHER PUBLICATIONS

International Search Report issued in International Patent Application No. PCT/JP2020/044304, dated Dec. 28, 2020, together with English translation thereof.

Primary Examiner — James A Shriver, II
Assistant Examiner — Michael T. Walsh
(74) Attorney, Agent, or Firm — Greenblum & Bernstein, P.L.C.

(57) ABSTRACT

An intake duct includes a duct body. The duct body includes an upstream opening and a downstream opening. The duct body includes a twisted and bent portion. The twisted and bent portion includes a first side section and a second side section. The upstream opening and the downstream opening respectively include first sections, which are on a first side in the height direction. The upstream opening and the downstream opening respectively include second sections, which are on a second side in the height direction. The twisted and bent portion is twisted and bent such that the first side section connects the first section of the upstream opening and the second section of the downstream opening to each other, and the second side section connects the second section of the upstream opening and the first section of the downstream opening to each other.

2 Claims, 2 Drawing Sheets

(56) References Cited

U.S. PATENT DOCUMENTS

| | | | |
|---|---|---|---|
| 9,643,483 B2* | 5/2017 | Cho | B60K 13/02 |
| 10,415,519 B2* | 9/2019 | Rikitake | F02M 35/10262 |
| 10,968,876 B2* | 4/2021 | Matos | F02M 35/10144 |
| 2015/0107563 A1 | 4/2015 | Naruoka et al. | |
| 2015/0114364 A1 | 4/2015 | Matsuda et al. | |
| 2015/0114365 A1 | 4/2015 | Naruoka et al. | |
| 2015/0114599 A1 | 4/2015 | Naruoka et al. | |
| 2015/0114744 A1 | 4/2015 | Naruoka et al. | |
| 2015/0114745 A1 | 4/2015 | Naruoka et al. | |
| 2015/0118025 A1 | 4/2015 | Naruoka et al. | |
| 2015/0118026 A1 | 4/2015 | Naruoka et al. | |
| 2015/0122232 A1 | 5/2015 | Naruoka et al. | |
| 2015/0159525 A1 | 6/2015 | Matsuda et al. | |
| 2015/0184586 A1 | 7/2015 | Tanaka et al. | |

* cited by examiner

INTAKE DUCT

TECHNICAL FIELD

The present disclosure relates to an intake duct.

BACKGROUND ART

As disclosed in Patent Document 1, an intake duct that includes a duct body having a flattened cross-sectional shape has been known as an intake duct provided in the intake duct system of an internal combustion engine. The duct body includes an upstream opening at one end in the longitudinal direction, and a downstream opening at the other end in the longitudinal direction. The duct body is formed such that the center line of the upstream opening and the center line of the downstream opening are skew to each other.

PRIOR ART DOCUMENT

Patent Document

Patent Document 1: Japanese Patent No. 5993949

SUMMARY OF THE INVENTION

Problems that the Invention is to Solve

In the above-described intake duct, since the center line of the upstream opening and the center line of the downstream opening are skew to each other, the bent shape of the duct body is inevitably complicated depending on how the duct body is bent. For example, the duct body is bent at two or more sites.

If the duct body has such a complicated bent shape, an air flow through the interior of the duct body from the upstream opening to the downstream opening may create many secondary flows, which are swirls of air in planes vertical to the flowing direction of the air. Streams of air passing through the duct body include the streams flowing along the inner wall of the duct body. The secondary flows cause the streams flowing along the inner wall of the duct body to separate from the inner wall, causing turbulence in the air flow through the duct body. This increases the flow resistance of the air passing through the duct body.

Accordingly, it is an objective of the present disclosure to provide an intake duct that suppresses an increase in the flow resistance of air when the air passes through a duct body.

Means for Solving the Problems

Means and operational advantages for solving the above-described problem will now be described.

To achieve the foregoing objective, an intake duct including a duct body having a flattened cross-sectional shape is provided. The duct body includes an upstream opening at one end in a longitudinal direction, and a downstream opening at another end in the longitudinal direction. The duct body is formed such that a center line of the upstream opening and a center line of the downstream opening are skew to each other. The duct body includes a twisted and bent portion that connects the upstream opening and the downstream opening to each other. The duct body has a width direction and a height direction and is formed to have a shape flattened with respect to the height direction. The twisted and bent portion includes a first side section, which is on one side in the height direction. The twisted and bent portion includes a second side section, which is on another side in the height direction. The upstream opening and the downstream opening respectively include first sections, which are on a first side in the height direction. The upstream opening and the downstream opening respectively include second sections, which are on a second side in the height direction. The twisted and bent portion is twisted and bent such that the first side section connects the first section of the upstream opening and the second section of the downstream opening to each other, and the second side section connects the second section of the upstream opening and the first section of the downstream opening to each other.

With the above-described configuration, the twisted and bent portion connects the upstream opening and the downstream opening to each other. Thus, even though the center line of the upstream opening and the center line of the downstream opening are skew to each other, the duct body needs to be bent only at one site. Also, the duct body is prevented from being bent in a complicated manner Thus, it is possible to prevent secondary flows from occurring excessively due to a complicated bent structure of the duct body when air flows through the interior of the duct body from the upstream opening to the downstream opening. This suppresses the increase in the flow resistance of the air passing through the duct body due to secondary flows.

MODES FOR CARRYING OUT THE INVENTION

An intake duct according to one embodiment will now be described with reference to FIGS. 1 to 5.

Figure 1:
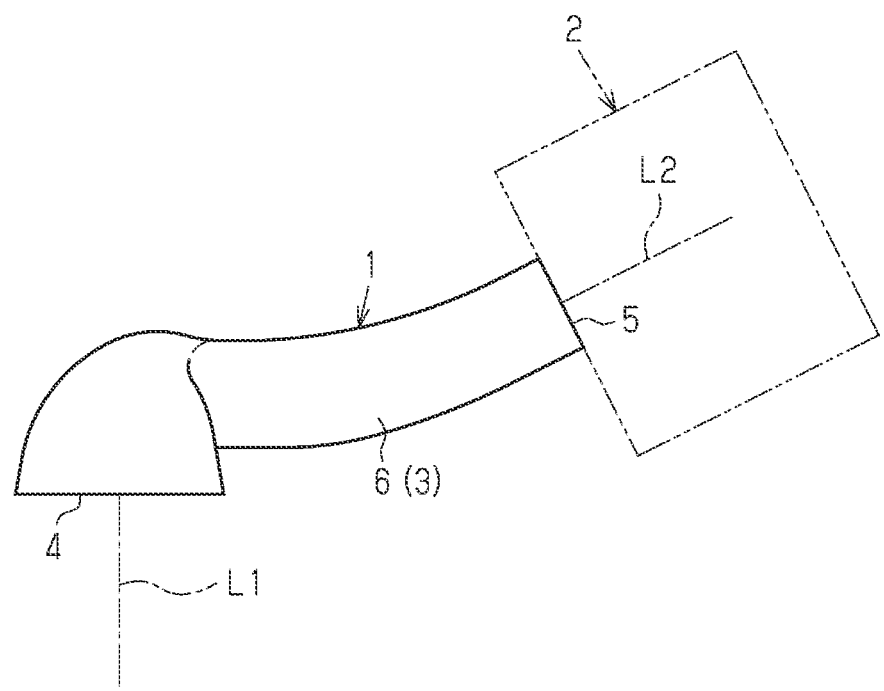
FIG. 1 is a plan view of an intake duct and an air cleaner, which are installed in the intake system of an internal combustion engine.

An intake system of an internal combustion engine includes an intake duct 1 and an air cleaner 2 as shown in FIG. 1. Air that is introduced into the air cleaner 2 through the intake duct 1 is drawn into the internal combustion engine after foreign matter is removed from the air by the air cleaner 2.

The intake duct 1 includes a duct body 3. The duct body 3 includes an upstream opening 4 at one end in the longitudinal direction, and a downstream opening 5 at the other end in the longitudinal direction. The duct body 3 has a flattened cross-sectional shape and is formed such that a center line L1 of the upstream opening 4 and a center line L2 of the downstream opening 5 are skew to each other. Being "skew to each other" refers to a situation in which the center line L1 and the center line L2 are not parallel and do not cross.

Figure 2:
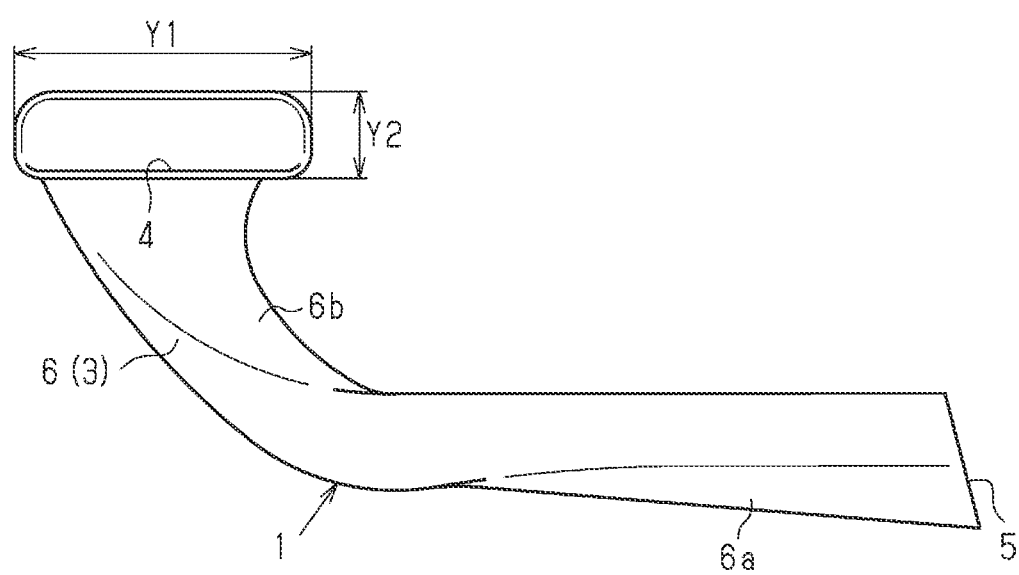
FIG. 2 is a front view showing the intake duct.
Figure 3:
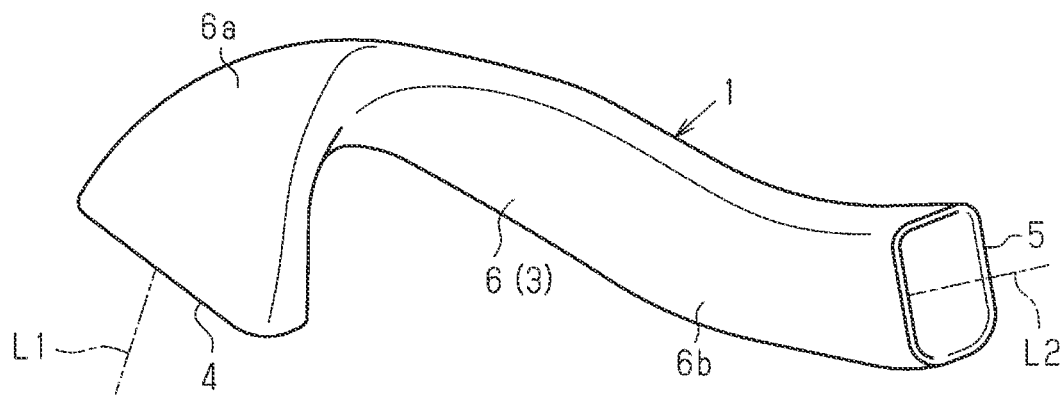
FIG. 3 is a perspective view showing the intake duct.

A width direction is indicated by arrow Y1, and a height direction is indicated by arrow Y2 in FIG. 2. The duct body 3 is formed to have a shape flattened with respect to the height direction (arrow Y2) as shown in FIGS. 2 and 3. The duct body 3 also includes a twisted and bent portion 6, which connects the upstream opening 4 and the downstream opening 5 to each other. The twisted and bent portion 6 includes a first side section 6a, which is on one side in the height direction, and a second side section 6b, which is on the other side in the height direction.

Figure 4:
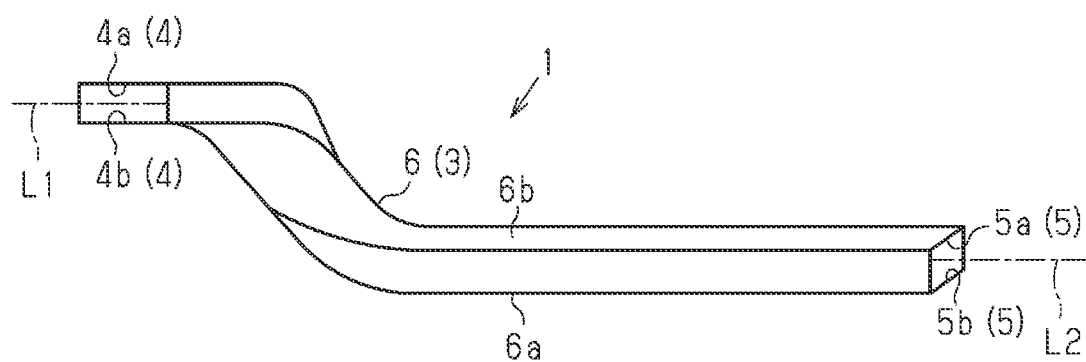
FIG. 4 is a schematic diagram showing a manner in which the intake duct is twisted and bent.

As shown in FIG. 4, the upstream opening 4 and the downstream opening 5 respectively include first sections 4a, 5a, which are on one side in the height direction (upper side in FIG. 4). Also, the upstream opening 4 and the downstream opening 5 respectively include second sections 4b, 5b, which are on the other side in the height direction (lower side in FIG. 4). That is, sections on a first side in the height direction of the upstream opening 4 and the downstream opening 5 are defined as the first sections 4a, 5a, respectively. Also, sections on a second side in the height direction of the upstream opening 4 and the downstream opening 5 are defined as the second sections 4b, 5b, respectively. In this case, the twisted and bent portion 6 connects the upstream opening 4 and the downstream opening 5 to each other in the following manner That is, the twisted and bent portion 6 is twisted and bent such that the first side section 6a connects the first section 4a of the upstream opening 4 and the second section 5b of the downstream opening 5 to each other, and the second side section 6b connects the second section 4b of the upstream opening 4 and the first section 5a of the downstream opening 5 to each other.

An operation of the intake duct 1 of the present embodiment will now be described.

In the intake duct 1, the center line of the upstream opening and the center line of the downstream opening are skew to each other. Thus, the bent shape of the duct body 3 may be complicated depending on how the duct body 3 is bent. For example, the duct body 3 may be bent at two or more sites.

Figure 5:
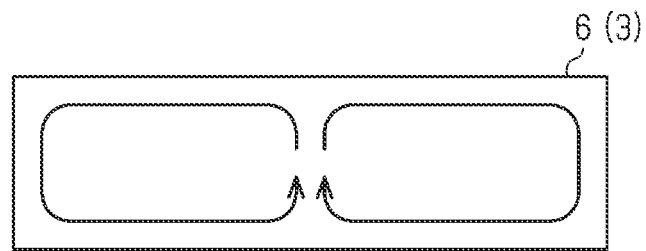
FIG. 5 is a diagram showing a manner in which secondary flows occur.

If the duct body 3 had such a complicated bent shape, an air flow through the interior of the duct body 3 from the upstream opening 4 to the downstream opening 5 would create many secondary flows, which are swirls of air in planes vertical to the flowing direction of the air. FIG. 5 shows a manner in which such secondary flows are created. In the duct body 3 (twisted and bent portion 6) shown in FIG. 5, the lower side corresponds to the inner side of a bent section, and the upper side corresponds to the outer side of the bent section.

Increased secondary flows increase the flow resistance of the air passing through the duct body 3. Specifically, streams of air passing through the duct body 3 include the streams flowing along the inner wall of the duct body 3, and the secondary flows cause the streams flowing along the inner wall of the duct body 3 to separate from the inner wall, causing turbulence in the air flow through the duct body 3. This increases the flow resistance of the air passing through the duct body 3.

However, since the twisted and bent portion 6 of the intake duct 1 connects the upstream opening 4 and the downstream opening 5 to each other, while being twisted and bent in the above described manner, the duct body 3 needs to be bent only at one site, even though the center line L1 of the upstream opening 4 and the center line L2 of the downstream opening 5 are skew to each other. Thus, the manner in which the duct body 3 is bent is not complicated. Thus, it is possible to prevent secondary flows from occurring excessively due to a complicated bent structure of the duct body 3 when air flows through the interior of the duct body 3 from the upstream opening 4 to the downstream opening 5. This suppresses the increase in the flow resistance of the air passing through the duct body 3 due to secondary flows.

The present embodiment as described above has the following advantage.

Even though the intake duct 1 (duct body 3) is formed such that the center line L1 of the upstream opening 4 and the center line L2 of the downstream opening 5 are skew to each other, it is possible to suppress an increase in the flow resistance of air that passes through the duct body 3 from the upstream opening 4 toward the downstream opening 5.

DESCRIPTION OF THE REFERENCE NUMERALS

1 . . . Intake Duct; 2 . . . Air Cleaner; 3 . . . Duct Body; 4 . . . Upstream Opening; 4a . . . First Section; 4b . . . Second Section; 5 . . . Downstream Opening; 5a . . . First Section; 5b . . . Second Section; 6 . . . Twisted and Bent Portion; 6a . . . First Side Section; 6b . . . Second Side Section

The invention claimed is:

1. An intake duct, comprising a duct body having a flattened cross-sectional shape, wherein
   the duct body includes an upstream opening at one end in a longitudinal direction, and a downstream opening at another end in the longitudinal direction,
   the duct body is formed such that a center line of the upstream opening and a center line of the downstream opening are skew to each other,
   the duct body includes a twisted and bent portion that connects the upstream opening and the downstream opening to each other,
   a cross-section of the duct body at the upstream opening and the downstream opening has a quadrilateral shape flattened such that a length in a width direction is longer than a length in a height direction,
   the twisted and bent portion includes a first side section, which is on one side in the height direction,
   the twisted and bent portion includes a second side section, which is on another side in the height direction,
   the upstream opening and the downstream opening respectively include first sections, which are on a first side in the height direction,
   the upstream opening and the downstream opening respectively include second sections, which are on a second side in the height direction, and
   the twisted and bent portion is twisted and bent at one site such that
      the duct body is bent only at the one site and is not bent at a site other than the one site between the upstream opening and the downstream opening,
      the first side section connects the first section of the upstream opening and the second section of the downstream opening to each other, and
      the second side section connects the second section of the upstream opening and the first section of the downstream opening to each other.

2. The intake duct according to claim 1, wherein the duct body does not include a joint between the upstream opening and the downstream opening, such that an inner surface and an outer surface of the duct body are smooth.

* * * * *